United States Patent [19]

Kawamura

[11] Patent Number: 4,491,875
[45] Date of Patent: Jan. 1, 1985

[54] APPARATUS AND METHOD FOR TONAL IMAGE PROCESSING

[75] Inventor: Naoto Kawamura, Inagi, Japan

[73] Assignee: Canon Kabushiki Kaisha, Tokyo, Japan

[21] Appl. No.: 583,294

[22] Filed: Feb. 28, 1984

Related U.S. Application Data

[63] Continuation of Ser. No. 314,439, Oct. 23, 1981, abandoned.

[30] Foreign Application Priority Data

Oct. 30, 1980 [JP] Japan ................ 55-151477
Oct. 30, 1980 [JP] Japan ................ 55-151478

[51] Int. Cl.³ .................. H04N 1/30; H04N 1/40
[52] U.S. Cl. .................. 358/298; 358/300; 358/283; 330/69
[58] Field of Search ........... 358/298, 283, 300, 296; 346/160, 76 L; 330/69, 259

[56] References Cited

U.S. PATENT DOCUMENTS

| | | | |
|---|---|---|---|
| 3,916,096 | 10/1975 | Everett | 358/283 |
| 3,997,719 | 12/1976 | Judice | 358/240 |
| 4,081,828 | 3/1978 | Jones | 358/298 |
| 4,284,912 | 8/1981 | Fujisaki | 330/254 |
| 4,351,005 | 9/1982 | Imai | 358/300 |

Primary Examiner—Alan Faber
Attorney, Agent, or Firm—Fitzpatrick, Cella, Harper & Scinto

[57] ABSTRACT

An apparatus for processing an image having half-tone and composed of plural pixels by dividing each of said pixels into small sections arranged in a matrix and respectively constituting micro-pixels with luminosity that can be respectively designated according to a determined gradation, by representing the luminosity to be designated to each of the first-mentioned pixels by the luminosity in the form of systematic dither method for the plural micro-pixels in said pixel.

18 Claims, 15 Drawing Figures

APPARATUS AND METHOD FOR TONAL IMAGE PROCESSING

This application is a continuation of U.S. patent application Ser. No. 314,439 filed Oct. 23, 1981, now abandoned.

BACKGROUND OF THE INVENTION

1. Field of the Invention

The present invention relates to an apparatus for tonal image processing, and more particularly to such an apparatus, for example a laser beam printer providing an image with half-tone, with improved resolution and gradation.

2. Description of the Prior Art

Scanning systems utilizing a rotary polygonal mirror or vibrating mirror are commonly employed in various displays facsimile, printing apparatus etc. utilizing a laser source because of the advantages of large scanning angle and small color dispersion, and particularly those utilizing a rotary polygonal mirror are used as high-speed scanning apparatus.

In order to record or display an image with continuous or half-tone in such a scanning system, there are known the systematic dither method and the density method which are effective for forming an image with half-tone with a recording or displaying medium only capable of representing white and black.

FIG. 1 schematically shows such systematic dither method. Quantized and sampled input image signal x generally has density information of K bits per pixel and is compared for each pixel with a threshold value C to provide a binary output signal 1 or 0 respectively when it is larger or smaller than said threshold value C, wherein said threshold value assumes one of the values of K bits. In this manner the input image signal of K bits/pixel is converted by the comparator into binary image signal of 1 bit/pixel.

The threshold values C are generally represented in a matrix corresponding to the pixels. In the systematic dither method proposed is Judice's matrix which assumes the following form for each pixel in case the pixel is composed of $2 \times 2 = 4$ dots or micro-pixels:

$$D^2 = \begin{vmatrix} 0 & 2/4 \\ 3/4 & 1/4 \end{vmatrix} \quad (1)$$

or the following form in case the pixel is composed of $4 \times 4 = 16$ dots:

$$D^4 = \begin{vmatrix} 0 & 8/16 & 2/16 & 10/16 \\ 12/16 & 4/16 & 14/16 & 6/16 \\ 3/16 & 11/16 & 1/16 & 9/16 \\ 15/16 & 7/16 & 13/16 & 5/16 \end{vmatrix} \quad (2)$$

wherein the area of each dot is equal to ¼ of each pixel in case of the matrix (1) or 1/16 in case of the matrix (2). Generally speaking the gradation becomes richer as the dimension of the matrix is increased, and an $n \times n$ matrix can represent $n^2 + 1$ steps including zero level.

The half-tone representation by such method has the advantages of:

(1) simplicity in system as each dot can be recorded in two steps of black or white; and (2) the resulting possibility of using a photosensitive member with non-linear characteristics:

while it is associated with the disadvantages of:

(1) poor resolution as each pixel is composed of plural dots; and (2) a larger pixel area required for obtaining improved gradation, leading to further deteriorated resolution.

SUMMARY OF THE INVENTION

The object of the present invention is to provide an apparatus for tonal image processing not associated with the mutually contradicting drawbacks mentioned above and capable of providing improved resolution and gradation in a stable manner.

Another object of the present invention is to provide an apparatus for tonal image processing capable of constantly maintaining an appropriate gradation of the tonal image.

Still another object of the present invention is to provide an apparatus for tonal image processing capable of forming an image with improved resolution and gradation by constituting each pixel by a combination of micro-pixels each representing at least three luminosity levels including white, black and at least an intermediate luminosity, wherein said micro-pixels are small image sections arranged in a matrix form and respectively having a determined luminosity level to define the gradation of the pixel.

DETAILED DESCRIPTION OF THE PREFERRED EMBODIMENTS

For the purpose of simplicity the following description will be directed to the formation of a tonal image with so-called three-value method utilizing white, black and an intermediate luminosity level therebetween, although in the present invention there may naturally be employed plural intermediate luminosity levels between white and black.

Figure 1:
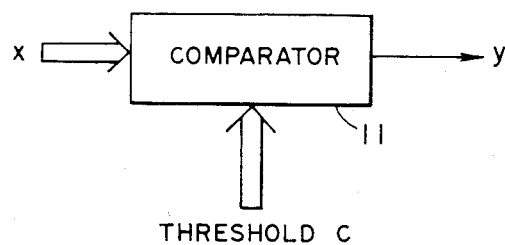
FIG. 1 is a schematic view explaining the ordinary systematic dither method.
Figure 2:
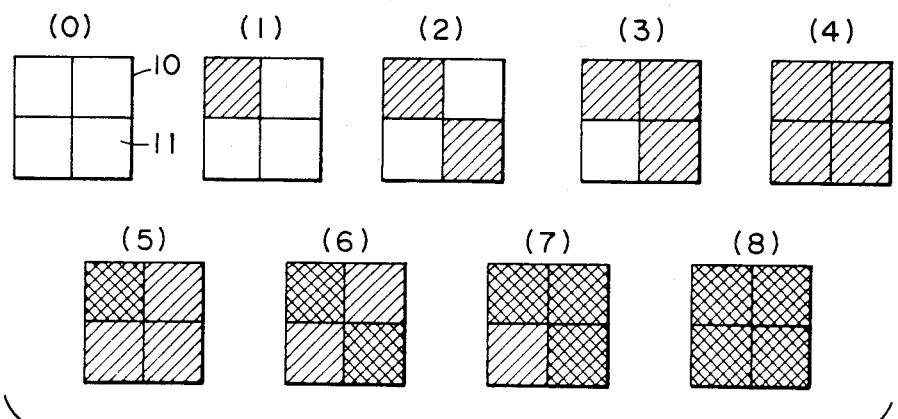
FIGS. 2 and 3 are views showing luminosity levels of a pixel composed of a $2 \times 2$ matrix of micro-pixels each having three luminasity levels.
Figure 3:
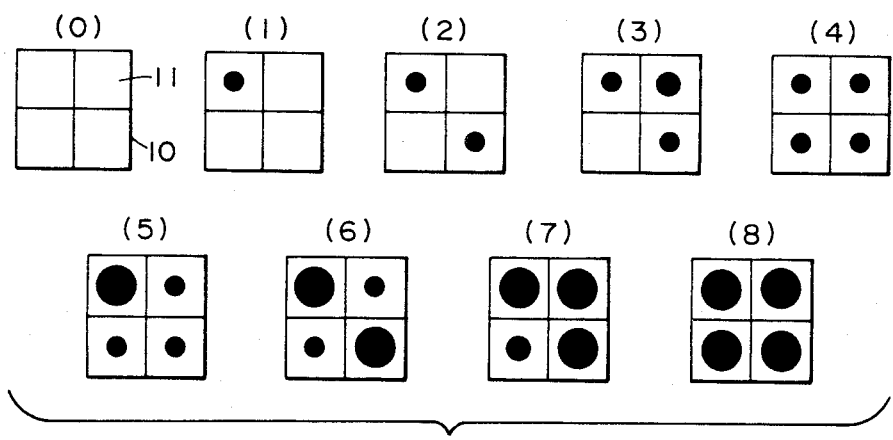

In the case of the three-value method employing a gray dot (micro-pixel) or a black dot with a half area in addition to the white and black dots, an n×n dither matrix will provide $2n^2+1$ luminosity levels which is approximately doubled in comparison with the aforementioned case. FIGS. 2 and 3 illustrate the dither matrixes of such 3-value method, wherein FIG. 2 shows the use of an intermediate density level in the micro-pixel while FIG. 3 shows the use of a black smaller dot in the micro-pixel. Both in FIGS. 2 and 3 the dimension of the matrix corresponds to each pixel.

In FIG. 2 a pixel having 9 luminosity levels is composed of four micro-pixels each of which is white, black (represented by double hatching) or gray (represented by single hatching).

Also in FIG. 3, a pixel having 9 luminosity levels is composed of four micro-pixels each of which is represented by white, a larger black circle or a smaller black circle having an area equal to a half of that of said larger black circle.

The photosensitive characteristic, or the contrast $\gamma$, of the photosensitive member determines either the patterns shown in FIG. 2 or those shown in FIG. 3.

In this manner a pixel composed of an n×n matrix of micro-pixels each having three luminosity levels provides an image having $2 \times n \times n + 1$ luminosity levels, which are approximately doubled in comparison with $2 \times n + 1$ levels achievable with the n×n matrix of micro-pixels having two luminosity levels. Also such method allows reduction in the dimension of each pixel in comparison with the conventional method having a same number of gradation levels, thus enabling to obtain a tonal image with improved image resolution.

In case of FIGS. 2 and 3 there can be considered the following two dither matrixes for comparison with the corresponding pixels:

$$D_1^2 = \begin{vmatrix} 0 & 2/8 \\ 3/8 & 1/8 \end{vmatrix} \quad (3)$$

$$D_2^2 = \begin{vmatrix} 4/8 & 6/8 \\ 7/8 & 5/8 \end{vmatrix} \quad (4)$$

In case the input image information has a uniform density represented by:

$$X(i) = \begin{vmatrix} i/8 & i/8 \\ i/8 & i/8 \end{vmatrix} (i = 1,2,\ldots,8) \quad (5)$$

it is compared with the above-mentioned dither matrixes to obtain an output signal 1 if the image information is larger or 0 otherwise. The output image information is represented as follows in case of i=2:

$$Y_1(2) = \begin{vmatrix} 1 & 0 \\ 0 & 1 \end{vmatrix} \quad (6)$$

$$Y_2(2) = \begin{vmatrix} 0 & 0 \\ 0 & 0 \end{vmatrix} \quad (7)$$

Thus the image output shown in FIG. 2 (2) or FIG. 3 (2) can be obtained by taking Y1 as the representation corresponding to the intermediate density or small black dots for the micro-pixels and Y2 as the representation corresponding to the higher density or larger black dots for the micro-pixels.

Similarly in case of i=6:

$$Y_1(6) = \begin{vmatrix} 1 & 1 \\ 1 & 1 \end{vmatrix} \quad (8)$$

$$Y_2(6) = \begin{vmatrix} 1 & 0 \\ 0 & 1 \end{vmatrix} \quad (9)$$

In this manner there is obtained high density output corresponding to Y2 and the intermediate density output corresponding to Y1. At this point a preference for the higher density is introduced in such a manner that the instruction for the high density output prevails over that for the intermediate density output. Thus there is obtained:

$$Y_1(6) = \begin{vmatrix} 0 & 1 \\ 1 & 0 \end{vmatrix} \quad (10)$$

corresponding to FIGS. 2(6) or FIG. 3(6).

Figure 4:
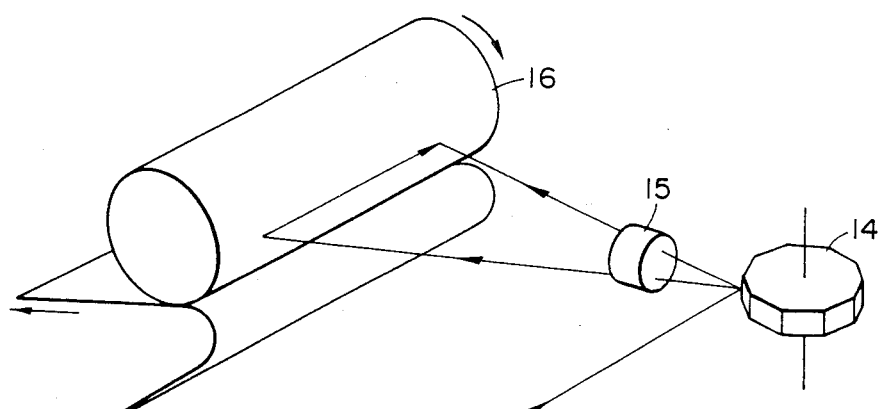
FIG. 4 is a schematic view showing an example of the tonal image forming apparatus in which the present invention is applicable.

FIG. 4 shows an embodiment of the apparatus for obtaining a tonal image according to the present invention, wherein a beam from a semiconductor laser 12 is converted into a parallel beam by a collimating lens 13, then is deflected by a deflector 14 composed of a rotary polygonal mirror and is focused on a photosensitive drum 16 through an imaging lens 15 such as an F.$\theta$ lens. The one-dimensional scanning by said light beam is achieved by the rotation of said rotary polygonal mirror 14, while two-dimensional scanning on the periphery of the photosensitive drum 16 is achieved by the rotation thereof. An image pattern involving desired tonal rendition is formed on the photosensitive drum 16 by modulating said semiconductor laser 12 with a drive circuit to be explained later.

Figure 5:
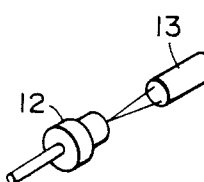
FIG. 5 is a schematic view showing the image forming process.
Figure 5:
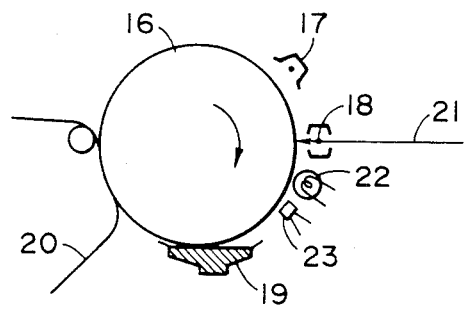

The image forming process in the apparatus shown in FIG. 4 is explained by FIG. 5. Said photosensitive drum 16 is provided on the periphery thereof with a coated photoconductive layer, which is covered, in the so-called NP process employed in the present embodiment, with an insulating layer. At a first step said insulating layer is given thereon uniform positive charge by a primary charger 17. Subsequently the drum 16 is exposed to the modulated laser beam 21 from the semiconductor laser 12, simultaneously with an AC corona discharge from a charge eliminator 18. Upon subsequent exposure of the photosensitive layer uniformly to the light from a flush exposure lamp 22, the image information is stored on the photosensitive drum 16 as a distribution of surface potential or as an electrostatic latent image. Said latent image is rendered visible by depositing the toner particles of an opposite polarity onto said photosensitive drum 16 in a developing device 19, and the visible image thus obtained is transferred onto a sheet of paper 20. At this point the surface potential of said electrostatic latent image is measured by a surface potential sensor 23 for stabilizing the image formation in the following manner.

Figure 6:
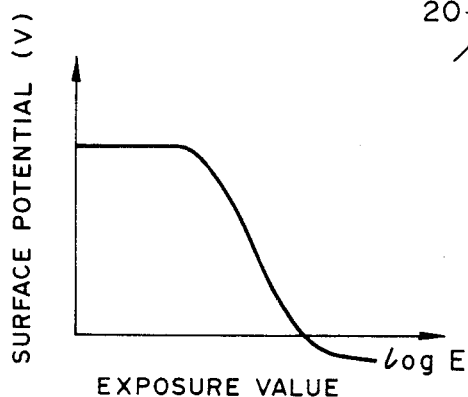
FIG. 6 is a chart showing the relationship between the amount of exposure E and the surface potential V.
Figure 7:
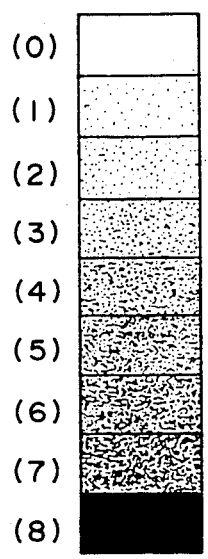
FIG. 7 is a chart showing a standard image pattern having ten luminosity levels.
Figure 8:
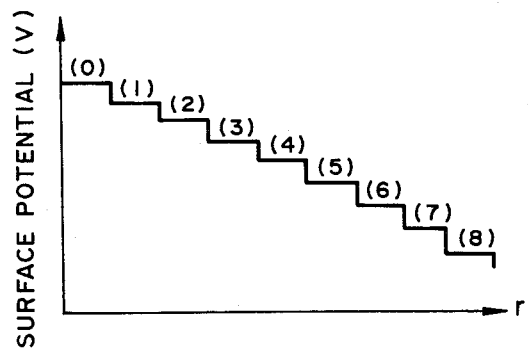
FIGS. 8, 13A and 13B are charts showing the relationship between the number of blacked-out micro-pixels and the surface potential.

In general, as shown in FIG. 6 giving the relationship between the amount of light exposure E and the surface potential V, the potential V becomes lower in an area receiving a larger amount of light. Therefore, by modulating the aforementioned laser beam 21 with a pixel composed of micro-pixels of three luminosity levels as shown in FIG. 2 or 3 so as to obtain an image pattern having 9 luminosity levels as shown in FIG. 7, there are obtained stepwise changing surface potentials as shown in FIG. 8, wherein the abscissa corresponds to the states of the micro-piexels.

Figure 9:
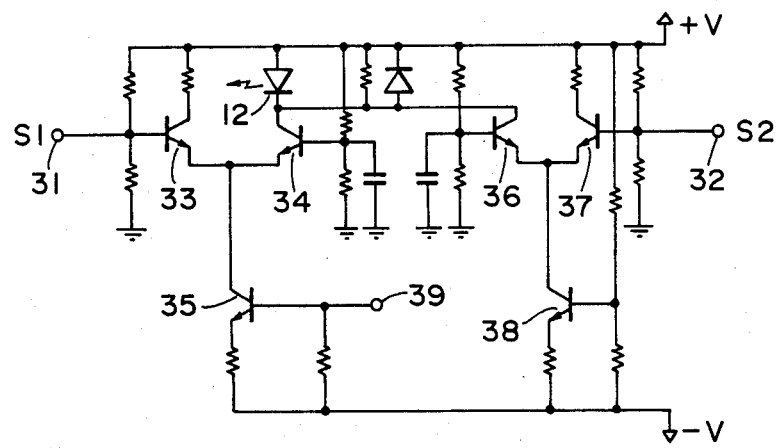
FIG. 9 is a circuit diagram for driving a semiconductor laser with three optical output levels.
Figure 10:
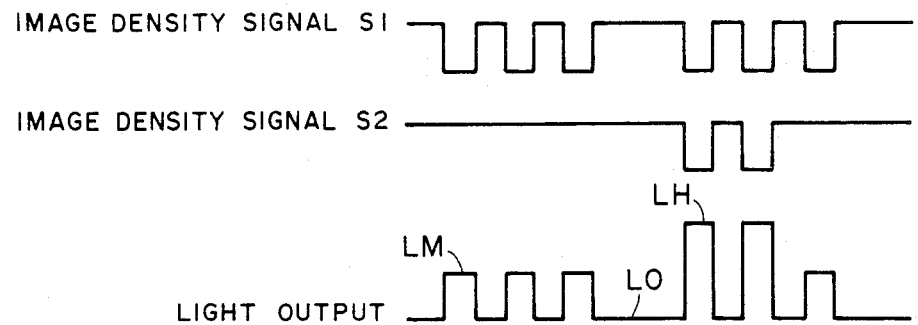
FIG. 10 is a timing chart showing various signals therein.

FIG. 9 shows a circuit for driving the semiconductor laser 12 shown in FIG. 4 to obtain three levels of optical output including zero level. In the present embodiment there are provided the aforementioned semiconductor laser 12, an input terminal 31 for the image density signal S1 in the form of binary signals, and an input terminal 32 for another image density signal S2 in the form of binary signals, whereby a pair of signals S1 and S2 as shown in FIG. 10 are supplied to said terminals 31 and 32 to control said semiconductor laser 12 thus obtaining optical outputs LO, LM and LH according to the three-value dither method. In said circuit the semiconductor laser 12 is driven in response to the image density signal S1 by two transistors 33, 34 constituting a differential switch wherein the current in said laser 12 is determined by the collector current in a current source transistor 35, and said laser 12 is also controlled in response to the image density signal S2 by two transistors 36, 37 constituting a differential switch wherein the current in said laser 12 is determined by the collector current in a current source transistor 38. Consequently it is rendered possible to drive the semiconductor laser 12 with different currents by supplying the image density signals S1 and S2 selectively to the corresponding terminals 31 and 32

In the present embodiment, in order to protect the semiconductor laser 12, it is desirable to determine the circuit parameters in such a manner that the maximum current in the semiconductor laser 12 is obtained when the low-level image density signals S1 and S2 are simultaneously supplied to the terminals 31 and 32, thus providing a laser beam giving rise to the maximum density of the image, and that the intermediate density is obtained corresponding to the intermediate output when the image density signal S1 is turned off. More specifically, referring to FIG. 10, the semi-conductor laser 12 provides a low-level output LO in response to the high-level image density signals S1 and S2, while the intermediate output LM is obtained when the signals S1 and S2 are respectively at the low-level and high-level, and the maximum output LH is obtained in response to the low-level signals S1 and S2.

Figure 11:
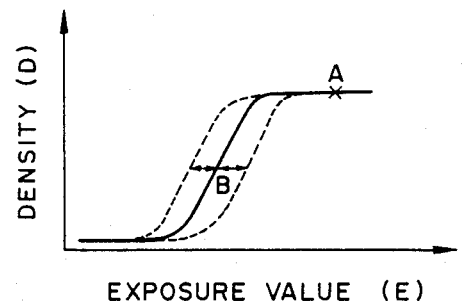
FIG. 11 is a chart showing the relationship the amount of exposure E and optical output D of the laser.

In order to provide different optical output signals LO, LM and LH in a stable manner in the image forming process, it is preferable to control the output signal LM corresponding to the intermediate density level by controlling the potential of a terminal 39 shown in FIG. 9, i.e. the base potential of the transistor 35. The superiority of the control of the intermediate optical output LM for stabilizing the optical outputs, in comparison with the control of the maximum optical output LH, is based on the following facts, with reference to FIG. 11 showing the relationship between the amount of exposure E and the laser output D:

(1) that the maximum optical output should be positioned at the saturation point A of the E-D curve in order to obtain a stable output; and
(2) that, in case of a shift in the E-D curve as shown by the broken lines due to changes in circumferential conditions, the intermediate density B is significantly affected while the maximum output is scarecely affected.

Consequently it is desirable to fix the maximum optical output LH at a constant current and to regulate the intermediate optical output LM.

Figure 13A:
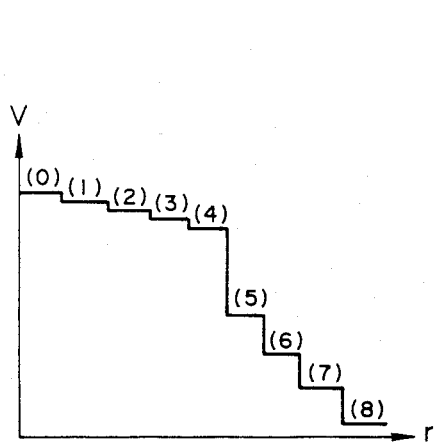
Figure 13B:
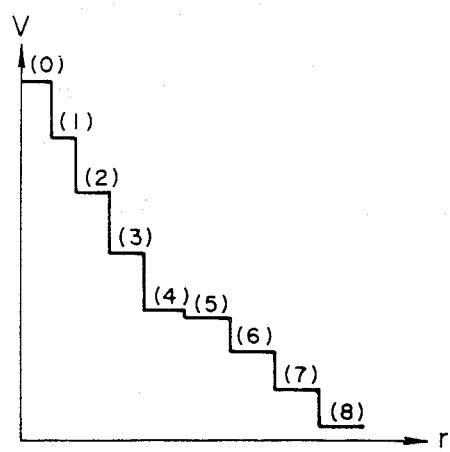

Thus an approximately uniform change between different surface potential levels can be achieved if the micro-pixels of the intermediate level are properly formed as shown in FIG. 7 by the three-level optical output signals LO, LM and LH. In practice, however, there may appear a discontinuous change in the surface potential between the levels (4) and (5) as shown in FIG. 13A or 13B where the structure of the micro-pixels is changed as shown in FIGS. 2 and 3. According to the present invention, therefore, the uniform level change is ensured by a control of the optical output in response to the measurement of the surface potential of the photosensitive drum 16 with a surface potential sensor 23 shown in FIG. 5. In said measurement the sensor 23 is so structured not to detect the potential in each micro-pixel, in order to obtain a macroscopic potential distribution measured in the unit of each pixel including plural micro-pixels.

Figure 12:
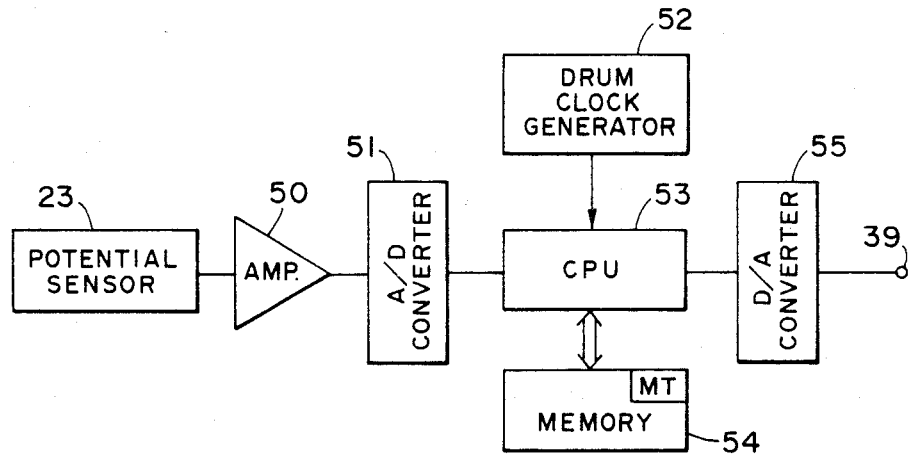
FIG. 12 is a block diagram for controlling the semiconductor laser shown in FIG. 9.

FIG. 12 shows a block diagram for the above-mentioned control of the optical output, wherein an output signal indicating the surface potential from the surface potential sensor 23 (cf. FIG. 5) is amplified in an amplifier 50, then digitalized by an analog-digital converter 51 and supplied to a memory 54 through an input port controlled by a central processing unit 53. This procedure is controlled by drum clock pulses obtained from a drum clock generator 52 in synchronization with the rotation of the photosensitive drum 16, and the surface potentials obtained by the semiconductor laser 12 driven by stepwise test pattern signals for image adjustment are successively stored in said memory 54. The linearity of potential levels becomes deteriorated as shown in FIGS. 13A and 13B if the intensity of the laser beam is inappropriate. FIG. 13A shows a case in which the intermediate optical output LM is excessively weak, whereby the potential difference is small from the levels (0) to (4) but is abruptly large between the levels (4) and (5). Also FIG. 13B shows a case of excessively strong intermediate optical output LM (though weaker than the maximum optical output) giving rise to an excessively small potential difference between the levels (4) and (5).

In order to obtain optimum optical outputs, it is necessary to control the intermediate optical output LM by controlling the base potential of the transistor 35 shown in FIG. 9 in response to the surface potential changes in the levels (0) to (4) and those in the levels (5) to (8), and this can be achieved by the following sequence.

Figure 14:
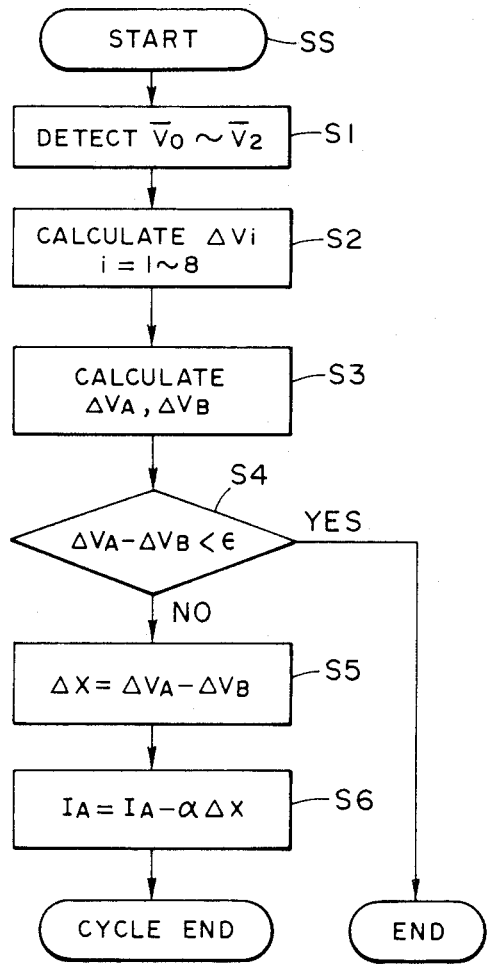
FIG. 14 is a flow chart showing the sequence of obtaining uniform luminosity levels.

Now reference is made to FIG. 14 showing the sequence of obtaining uniformly distributed potential levels.

Prior to entering said sequence, a test pattern of 9 potential levels as shown in FIG. 7 is recorded on the photosensitive drum by reading test pattern signals recorded in advance in a test pattern area of the memory 54. At said recording the terminal 39 is given a reference voltage VS determined by a signal obtained from the memory 54.

The different levels of said pattern are measured by the surface potential sensor 23 to provide average potentials $\overline{V}_0, \overline{V}_1, \ldots, \overline{V}_N$ for respective levels. In case of a 2×2 matrix wherein N=8, there will be obtained nine average values. Then in the step S2 calculated are the respective differences $\Delta V_i$ (i=1, 2, ..., 8), and in the step S3 calculated are the average values of said differences for the former and latter halves of the curve according to the following equations:

$$\Delta V_A = \tfrac{1}{4} \sum_{i=1}^{4} \Delta V_i$$

$$\Delta V_B = \tfrac{1}{4} \sum_{i=5}^{8} \Delta V_i$$

Then, if in the step S4 it is identified that the difference between $\Delta V_A$ and $\Delta V_B$ is smaller than a determined tolerance $\epsilon$, the sequence is completed at S7 without the step of bias adjustment. The above-mentioned result indicates that the differences between the levels are relatively uniform, so that the operation can be conducted with the reference voltage supplied to the terminal 39 at the formation of the test pattern. The above-mentioned tolerance $\epsilon$ can be determined suitably according to the precision of the apparatus.

On the other hand a correction is needed in case the difference between $\Delta V_A$ and $\Delta V_B$ is larger than the tolerance $\epsilon$, and said correction is to be made in such a manner as to decrease or increase the intermediate optical output LM respectively when $\Delta V - \Delta V_B$ is larger or smaller than zero, proportionally with the absolute value $|\Delta V_A - \Delta V_B|$. More specifically said correction is conducted in the steps S5 and S6 by regulating the voltage of the terminal 39 to a value VC1 in order to regulate the laser current $i_A$ corresponding the intermediate optical output LM to:

$i_A - \alpha(\Delta V_A - \Delta V_B)$ wherein $\alpha$ is a positive coefficient determined according to the characteristic of the apparatus.

Upon completion of the step S6, the program is repeated again from the starting step SS with said voltage VC1 applied to the terminal 39, in order to confirm if said voltage VC1 is appropriate. In this manner it is identified if $\Delta V_A - \Delta V_B < \epsilon$ in the step S4, and, if so, the program is completed at S7 but, if not, the step S5 is conducted again. In this manner the program is repeated until the program proceeds from the step S4 to S7 and is completed.

Upon arrival at S7 the current determined as explained above is converted into an analog signal by a digital-to-analog converter 55 shown in FIG. 12 and controls the voltage supplied to the terminal 39, which in turn controls the collector current of the transistor 35. Also in the above-mentioned control the coefficient $\alpha$ can be determined appropriately in consideration of the characteristic of the apparatus and of the visual ability of the human eyes. In the aforementioned electrophotographic process, said coefficient is preferably determined experimentally since various factors are non-linear and also since there may appear proximity effects depending on the dimension of the pixels and micro-pixels.

Although the foregoing embodiment is based on the dither method, the present invention is also applicable in the identical manner to the density method, in which one of predetermined patterns, for example those shown in FIG. 2 (0) to (8), is selectively allotted to each pixel information obtained.

In the present invention, the aforementioned control has to be conducted prior to the output of image signals. Said control, however, may be conducted immediately after the start of power supply or when the photosensitive drum has reached a constant revolution, and need not be conducted before every image output. Furthermore said control may be conducted manually at a suitable timing. Also in said control the image pattern shown in FIG. 7 need not be obtained by transfer on a sheet of paper. Furthermore, although the foregoing embodiment is based on an automatic control of the collector current of the current source transistor in response to the measurement of surface potential in order to optimize intermediate optical output, it is also possible to manually regulate the base current of the transistor by visual judgment of the image pattern obtained. In such case the apparatus may be equipped with a variable resistor or the like accessible from the exterior. and the adjustment can be executed manually based on the output of a test chart.

As explained in the foregoing, the apparatus for tonal image processing of the present invention is capable of providing a tonal image with improved resolution and with improved gradation in a stable manner.

Although the foregoing description has been concentrated on the use of three luminosity levels, it is naturally possible to obtain an image of continuous tone in a similar method with four or more luminosity levels. Also the foregoing description has been devoted to a laser beam printer, but the present invention is not limited to such case but is also applicable to the displays with plasma display device, liquid crystal display device, cathode ray tube etc. or to the printing with a facsimile device or with a printing machine.

What is claimed is:

1. An intermediate tone image processing method comprising the steps of:
   providing one of a plurality of potential levels, including an intermediate potential level, to each of a plurality of small areas on an image carrier adapted to bear an electrostatic latent image thereon;
   forming pixels having different gradation levels from combinations of the small areas, the gradation level of each pixel being determined by the combination of small areas;
   forming a pattern composed of a set of the pixels;
   detecting the density level of the pattern; and
   variably controlling the potential of the intermediate potential level in response to an output obtained in the detecting step.

2. The method according to claim 1, wherein the image carrier is a photosensitive member which is subjected to a laser beam of different intensities to provide the different potential levels.

3. The method according to claim 2, wherein the laser beam has three intensity levels, with the beam intensity in the intermediate level being variably controlled.

4. The method according to claim 1, wherein the pattern forming, detecting and controlling steps are carried out prior to an actual image formation, and a surface potential is detected for a density level in the detecting step.

5. An intermediate tone image processing apparatus comprising:
   semiconductor laser means for generating a laser beam in response to a drive signal;
   first switching means connected in series to said semiconductor laser means;
   seocnd switching means connected in series to said semiconductor laser means and connected in parallel with said first switching means;

control means for changing over the drive signal to one of a plurality of stages by controlling the combination of the ON and OFF states of said first and second switching means in response to a signal representative of the image density; and a recording medium on which information is recorded by irradiating laser light generated by said semiconductor laser means in at least three intenisties.

6. The apparatus according to claim 5, further comprising first constant current means for maintaining constant the current flowing through said first switching means.

7. The apparatus according to claim 6, further comprising means for introducing a signal for controlling the constant current supplied by said first constant current means.

8. A method for forming an intermediate tone image in which the image is composed of a set of pixels each of which is composed of a plurality of small areas, said method comprising the steps of:

generating an electrical signal representative of an image density;

providing a first dither pattern having a plurality of threshold levels;

providing a second dither pattern different from said first dither pattern and having a plurality of threshold levels;

generating binary signals in response to the electrical signal and in accordance with the first and second dither patterns;

forming a dot having a first density in a small area in one of said pixels in response to the binary signals generated in accordance with the first dither pattern; or forming a dot having a second density, higher than the first density, in the small area in response to the binary signals generated in accordance with the second dither pattern; formation of a dot having the second density in the small area precluding formation of a dot having the first density in the small area.

9. The method according to claim 8, wherein a dot having the first density is smaller in size than a dot having the second density.

10. The method according to claim 8, wherein no dot is formed in a small area when the level of the electrical signal is lower than both of the threshold levels of said first and second dither patterns.

11. The method according to claim 8, wherein a maximum threshold level of said first dither pattern is lower than a minimum threshold level of said second dither pattern.

12. An intermediate tone image forming method comprising the steps of:

forming a plurality of micro-pixels, each of which is of small area and has either low density, intermediate density or high density, in response to an electric signal representative of an image density;

forming a plurality of pixels each being formed by said plurality of micro-pixels; and forming an image by a set of pixels;

wherein each pixel is a combination of micro-pixels of low and intermediate density or a combination of micro-pixels of intermediate and high density such that there does not exist in a pixel a combination of low density and high density micro-pixels.

13. The method according to claim 12, wherein the micro-pixels of low density are formed without a dot therein.

14. The method according to claim 12, wherein the micro-pixels of intermediate and high densities are each formed with a dot therein, the dot for the intermediate and high density pixel being different in size.

15. An intermediate tone image forming apparatus in which the image is formed by a set of pixels each of which is formed by a plurality of small areas, which comprises:

means for representing the pixels with a plurality of gradation levels by different combinations of micro-pixels each of which comprises a small area, each of the small areas having one of low density, intermediate density and high density, in response to an image density signal;

means for detecting respective differences between adjacent ones of the gradation levels of at least three pixels represented by said representing means; and control means for variably controlling the density of the small areas having the intermediate density when the magnitudes of the respective differences of the gradation levels are not uniform.

16. The apparatus according to claim 15, wherein said detecting means detects both of the difference in a high gradation region and the difference in a low gradation region, and said control means variably controls the density level of said small areas of the intermediate density in accordance with the difference between the differences detected.

17. The apparatus according to claim 15, wherein said representing means forms dots for the micro-pixels of high and intermediate densities, and does not form a dot for a micro-pixel of low density.

18. The apparatus according to claim 15, wherein said representing means forms a pattern having a plurality of gradation levels prior to an actual image formation, said detecting means reading the density of the pattern.

* * * * *